United States Patent [19]

Yada et al.

[11] Patent Number: 5,500,264
[45] Date of Patent: Mar. 19, 1996

[54] HOLLOW EXTRUDATE

[75] Inventors: Yukihiko Yada; Tosikazu Ito, both of Nagoya; Katuyuki Amano, Handa, all of Japan

[73] Assignee: Tokai Kogyo Kabushiki Kaisha, Ohbu, Japan

[21] Appl. No.: 408,388

[22] Filed: Mar. 22, 1995

Related U.S. Application Data

[62] Division of Ser. No. 99,443, Jul. 30, 1993, Pat. No. 5,433,808.

[30] Foreign Application Priority Data

Jul. 31, 1992 [JP] Japan .................................... 4-225085
Jul. 31, 1992 [JP] Japan .................................... 4-225086

[51] Int. Cl.$^6$ ............................... B32B 3/06; B32B 3/10; B60J 10/02; E06B 7/16; E06B 7/23
[52] U.S. Cl. ........................ 428/36.9; 49/475.1; 49/490.1; 49/498.1; 52/716.2; 52/716.8; 52/717.03; 52/717.05; 296/146.1; 296/93; 428/122; 428/358; 428/398
[58] Field of Search ................................. 49/475.1, 490.1, 49/498.1; 52/716.2, 716.8, 717.03, 717.05; 296/146.1, 93; 428/36.9, 122, 358, 398

[56] References Cited

U.S. PATENT DOCUMENTS

| | | | |
|---|---|---|---|
| 4,214,036 | 6/1980 | Bright | 428/358 |
| 4,982,529 | 1/1991 | Mesnel | 428/122 |
| 5,009,947 | 4/1991 | McManus | 428/122 |
| 5,433,808 | 7/1995 | Yada et al. | 156/244.15 |

*Primary Examiner*—James C. Cannon
*Attorney, Agent, or Firm*—Oblon, Spivak, McClelland, Maier & Neustadt

[57] ABSTRACT

A hollow extrudate includes a long belt-shaped member produced by extrusion and having hollow portions extending in a longitudinal direction of the member wherein an outer surface of a cross-section of a wall forming the hollow portion orthogonal to the longitudinal direction has a substantially constant shape in the longitudinal direction. The member includes a solid portion extending in the longitudinal direction and interconnecting the hollow portions, the solid portion forming a reinforced portion of the member. The solid portion is formed by enlarging the walls of the hollow portion. The member also includes a first and second extruded region which are pressed together to form the hollow portion.

7 Claims, 16 Drawing Sheets

HOLLOW EXTRUDATE

This is a division of application Ser. No. 08/099,443 filed on Jul. 30, 1993, now U.S. Pat. No. 5,433,808.

BACKGROUND OF THE INVENTION

1. Field of the Invention

This invention relates to a hollow extrudate consisting of long belt-shaped members produced by extrusion and having a hollow portion.

2. Description of the Prior Art

Extrudates made of long belt-shaped members are generally adopted in a variety of application fields. For example, a long belt-shaped windshield molding is installed around the periphery of windshield glass mounted in the windshield frame opening of the body panels of motor vehicles. More precisely, a long, continuous belt-shaped space is formed between the periphery of the windshield glass and the edge of the windshield frame opening; the support leg of the windshield molding is inserted into this space and a decorative portion is provided on the outside edge of the support leg to cover said space from the outside. Furthermore, door moldings or weather strips are mounted on the edge corresponding to the waist line or sash of vehicle outer door plates, and bumper moldings are mounted on bumper outer faces.

To achieve weight reduction, resource conservation, sealing property improvement, etc., it has been proposed in the past that these various extrudates made of long belt-shaped members be provided with hollow portions. Examples include Japanese Patent Laid-Open No.6114/1984, Japanese Utility Model Laid-Open No. 163413/1987, and Japanese Patent Laid-Open No.172632/1988.

However, for conventional hollow extrudate featuring a hollow portion for weight reduction, etc., the rigidity of the extrudate itself, that is, its form-retaining property is reduced, with the result that the hollow extrudate is prone to displacement from its mounted position and form after mounting, or is prone to deformation. For example, a windshield molding containing a hollow portion is prone to being displaced from its mounted position on the windshield frame opening in the glass width direction or is prone to being crushed and deformed at the curved corners. If a molding is displaced from its mounted position or deformed, the hollow portion may be projected to the outside, the apparent width of the molding may vary, and the load on the hollow portion may be difficult to predict.

In order to eliminate the above-noted problems, the weather strips described in Japanese Patent Laid-Open No.169762/1991, Japanese Utility Model Publication No.4622/1989, and others are provided with reinforcing spacers inserted inside their hollow portions. It is, however, difficult to insert spacers at a specified position inside an elastic hollow portion both accurately and efficiently. Japanese Patent Laid-Open No.143715/1987 and Japanese Utility Model Laid-Open No.139423/1982 have proposed the installation of a stabilizer to keep the item in place. Such a stabilizer is essentially unnecessary and simply increases the number of parts.

SUMMARY OF THE INVENTION

The object of the present invention is to provide a hollow extrudate which of itself keeps a good mounted state without the use of other members such as spacers or stabilizers, and the production method thereof.

To achieve the above object, the hollow extrudate of the present invention consists of long belt-shaped members produced by extrusion and having a hollow portion extending in the longitudinal direction wherein the outer surface shape of the cross section of the wall forming said hollow portion orthogonal to the longitudinal direction, has approximately the same contour shape in the longitudinal direction and wherein an enlarged section made by enlarging the wall of this hollow portion to the hollow inner side is placed in the longitudinal direction.

The hollow extrudate production method of the present invention is to extrude long belt-shaped members having a hollow portion extending in the longitudinal direction through extrusion openings provided in the dies of an extruder wherein after the specified regions of the wall forming said hollow portion and the other regions are extruded separately at least in part from extrusion openings provided at separated positions on said dies, the specified regions of the wall of the hollow portion and the other regions are joined together into one piece; by performing extrusion while keeping constant the shape of the extrusion opening for forming the specified regions of the wall of said hollow portion, the outer surface shape of the cross section of the hollow portion has approximately the same contour shape throughout the entire length; by forming an enlarged section forming opening on the extrusion opening for forming said other regions so as to extend toward the hollow inner side of said inner portion and by performing extrusion while partly shielding this enlarged section forming opening by another die, a solid portion is formed by enlarging the other regions of the inner wall of said hollow portion to the hollow inner side; and by reciprocating with specified timing another die for shielding said enlarged section forming opening, the amount shielded by said other die is varied to form said enlarged section in the longitudinal direction.

In the hollow extrudate of such configuration, an enlarged section is provided inside the hollow portion of the hollow extrudate having the same contour shape throughout the entire length by enlarging the inner wall of the hollow portion. In this way, the regions of the hollow portion where reinforcement is required are reinforced by the enlarged section provided integrally with the hollow portion. Thus, required rigidity, that is, form-retaining property is attained and the hollow extrudate, of itself, can exhibit a good mounted state.

The hollow extrudate production method having the above-mentioned configuration allows the above-mentioned hollow extrudate to be easily extruded continuously in one piece.

BRIEF DESCRIPTION OF THE DRAWINGS

FIG. 17(a) is an explanatory side view and FIG. 17(b) is a cross-sectional view taken along the line XVII—XVII in FIG. 17(a).

DESCRIPTION OF THE PREFERRED EMBODIMENTS

The following describes the embodiments of the present invention according to the drawings.

Figure 1:
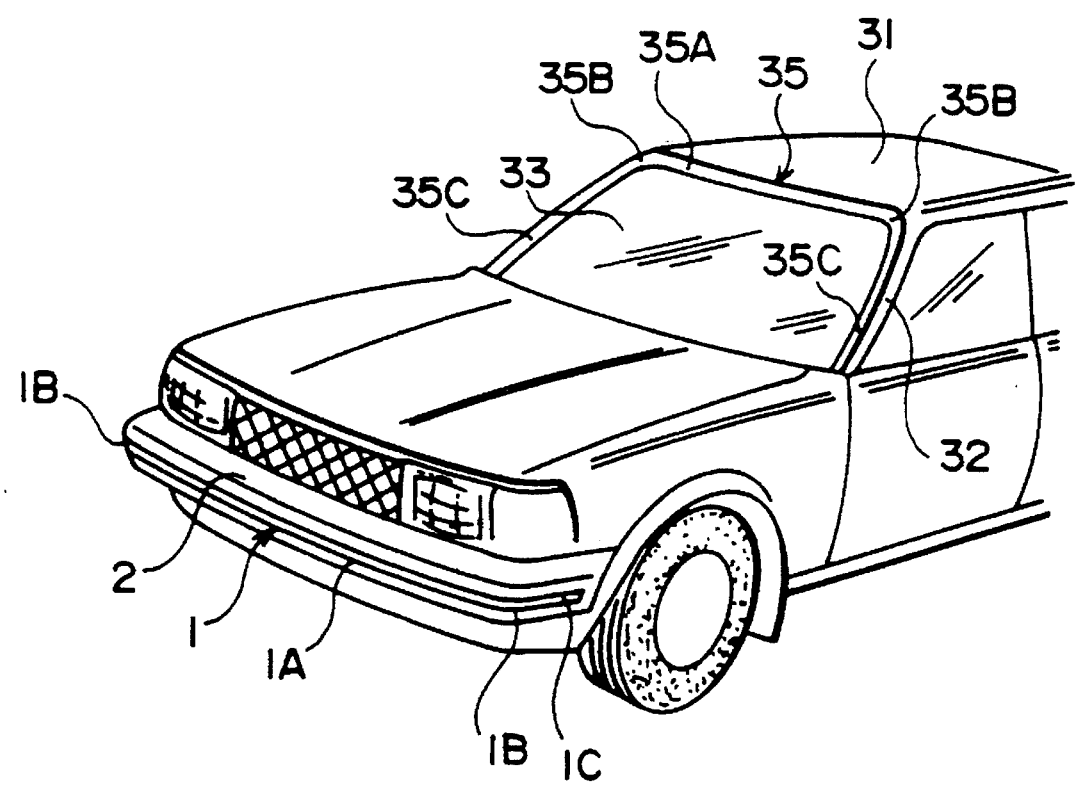
FIG. 1 is an explanatory perspective view showing the front of an automobile containing the bumper molding produced according to the present invention.
Figure 2:
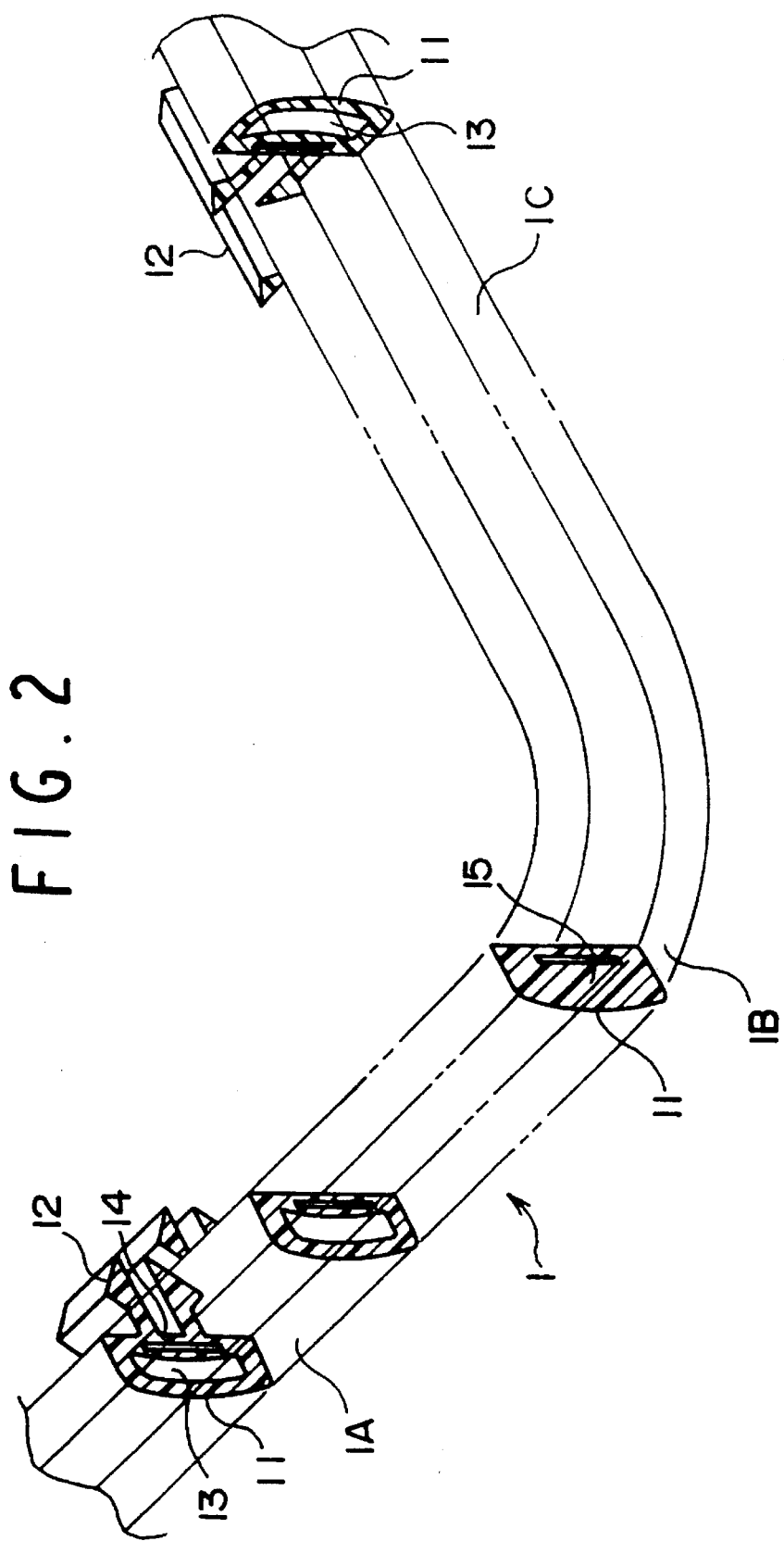
FIG. 2 is an explanatory cross-sectional view of a corner portion showing the mounted structure of the bumper molding in the first embodiment of the present invention.

The embodiment shown in FIGS. 1 to 9 is a bumper molding made by application of the present invention. The bumper molding 1 is made by extruding rubber, synthetic resin, etc., continuously in one piece. As FIG. 1 shows, it comprises, as general sections, a front molding section 1A and a pair of side molding sections 1C which are installed so as to form approximately straight lines on the front and sides of the bumper 2 of an automobile, respectively, and also comprises, as curved sections, a pair of corner molding sections 1B which are installed on the corners of the bumper 2 so as to form curved lines.

This bumper molding 1 includes, as a hollow portion, a decorative portion 11 exposed to the outside, and a support leg 12 projecting from this decorative portion 11 and inserted into the bumper 2. Said decorative portion 11 is composed of a hollow body with a cross section of an approximate D shape and has a hollow inner space 13 of an approximate arch shape. Of the four walls forming this hollow inner space 13, the base side near the bumper contains a thin plate shaped metal foil core 14 buried in it.

Figure 6:
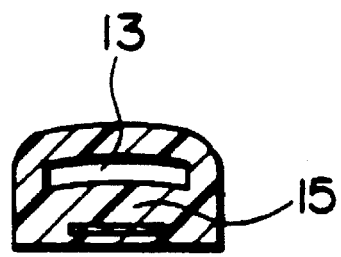
FIG. 6 is a cross-sectional view taken along the line VI—VI in FIG. 3.
Figure 7:
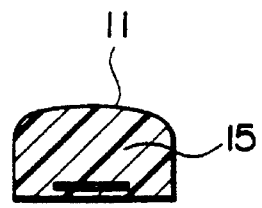
FIG. 7 is a cross-sectional view taken along the line VII—VII in FIG. 3.

The outer surface shape of the cross section of said decorative portion 11 orthogonal to the longitudinal direction has approximately the same contour shape throughout its entire length. An solid section 15, which is made by enlarging the bumper-side base of the walls forming said hollow inner space 13 to the side of the inner hollow space 13, is placed at the region corresponding to the corner molding section 1B, Said enlarged section 15 is formed so as to enlarge from the inner periphery side of the walls forming the hollow inner space 13 toward the outer periphery side. The enlargement amount, i.e., the thickness, is increased gradually toward the longitudinal direction, and after a solid state is reached, is decreased again. As FIG. 6 shows, the hollow inner space 13 is narrowed in the region where the thickness of the enlarged section 15 is increased or decreased, by the amount the thickness is enlarged.

Figure 3:
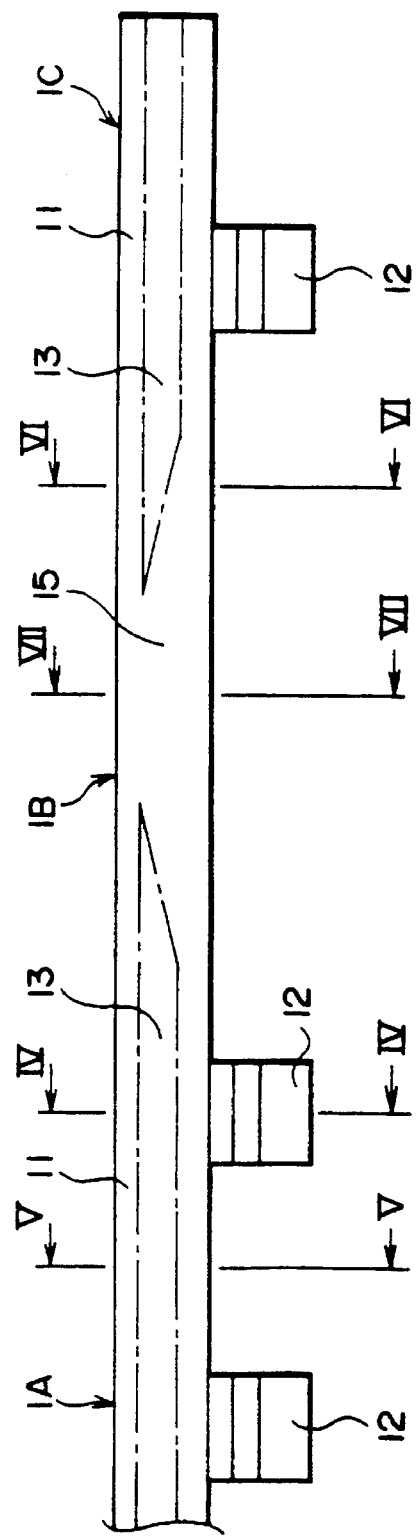
FIG. 3 is an explanatory enlarged side view of the enlarged section of the bumper molding shown in FIG. 2 immediately before being installed.
Figure 4:
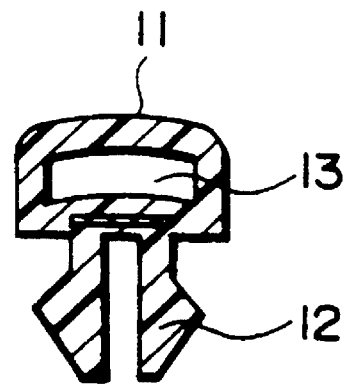
FIG. 4 is a cross-sectional view taken along the line IV—IV in FIGS. 3, 8, and 12.
Figure 5:
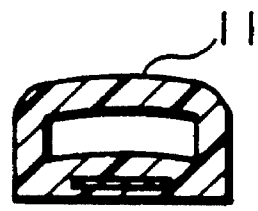
FIG. 5 is a cross-sectional view taken along the line V—V in FIG. 3.
Figure 8:
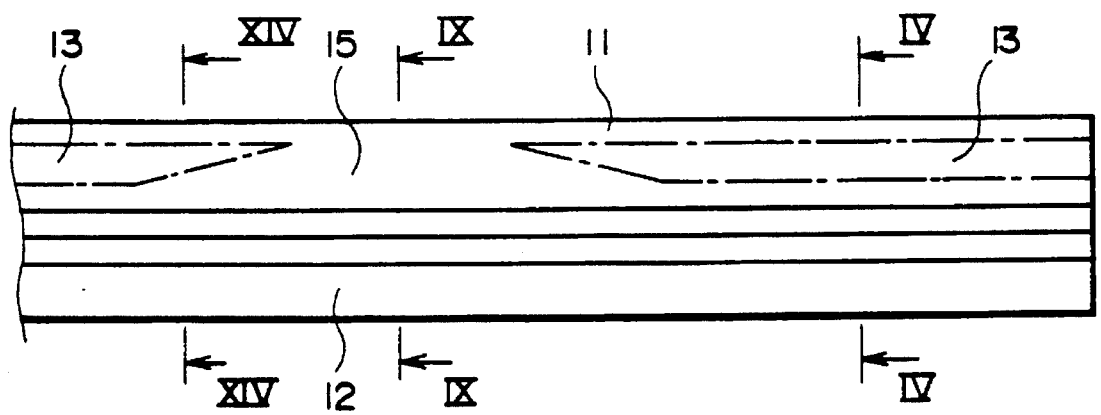
FIG. 8 is an explanatory side view showing the state of the bumper molding shown in FIG. 2 immediately after being extruded.
Figure 9:
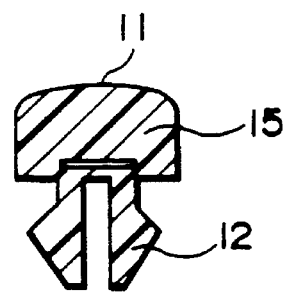
FIG. 9 is a cross-sectional view taken along the line IX—IX in FIGS. 8 and 12.

Said support leg 12 is provided at several places in the longitudinal direction of the molding and is projected from said decorative portion 11 so as to fork into parts. The tip of the projection is made into an arrow shape so as to engage with the bumper 2. To produce the support leg 12, the molding is first extruded with an approximately constant cross-sectional shape throughout its entire length to produce the support leg and the decorative portion 11 at the same time as shown in FIG. 8 and then the support leg 12 is removed from the portions where it is not required, by a specified cutting process. In this way, a molding such as shown in FIG. 3 is produced where multiple legs of the support leg 12 are located in the longitudinal direction of the molding.

As described above, the outer surface shape of the cross section of the decorative portion 11 of the bumper molding 1 in this embodiment orthogonal to the longitudinal direction has approximately the same contour shape throughout its entire length, and the decorative portion 11 is reinforced by the enlarged section 15 provided in the hollow inner space 13, at the regions where reinforcement is necessary, i.e., at corner molding sections 1B, thus providing necessary rigidity, i.e., a posture retaining property.

Accordingly, the molding is prevented from being displaced from the mounted position and mounted posture, and from being deformed at the curved corners.

The following describes the extruder for the bumper molding 1.

Figure 10:
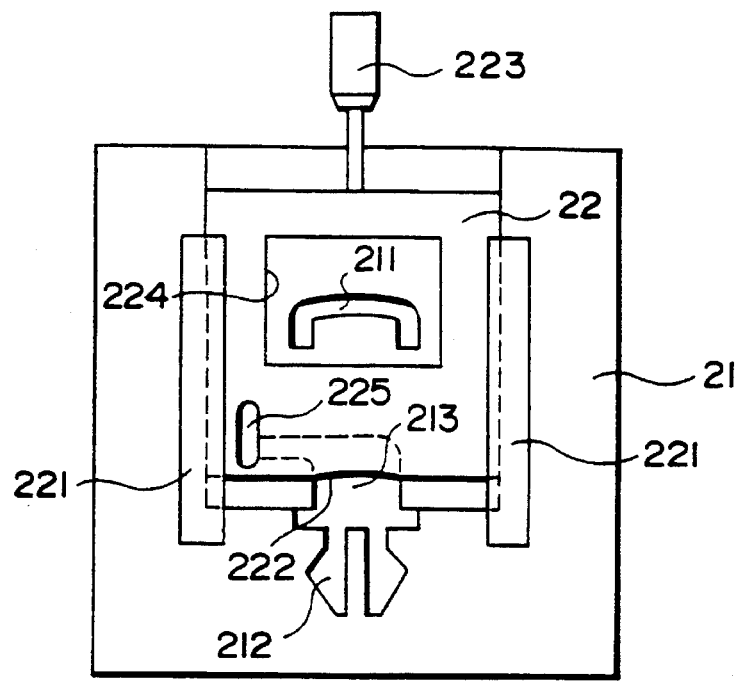
FIG. 10 is an explanatory front view showing an example of molding equipment (dies) for the bumper molding shown in FIGS. 2 to 9.
Figure 11:
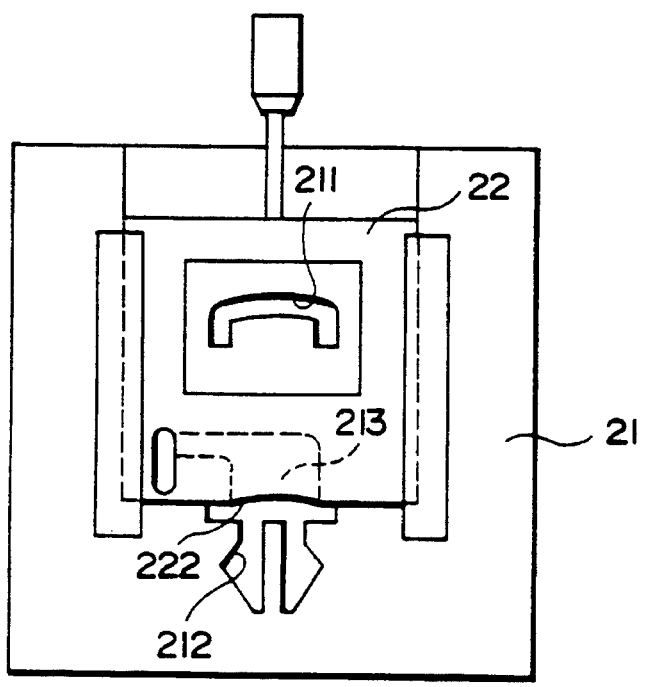
FIG. 11 is a cross-sectional view showing the molding equipment (dies) shown in FIG. 10 in a moved state.
Figure 12:
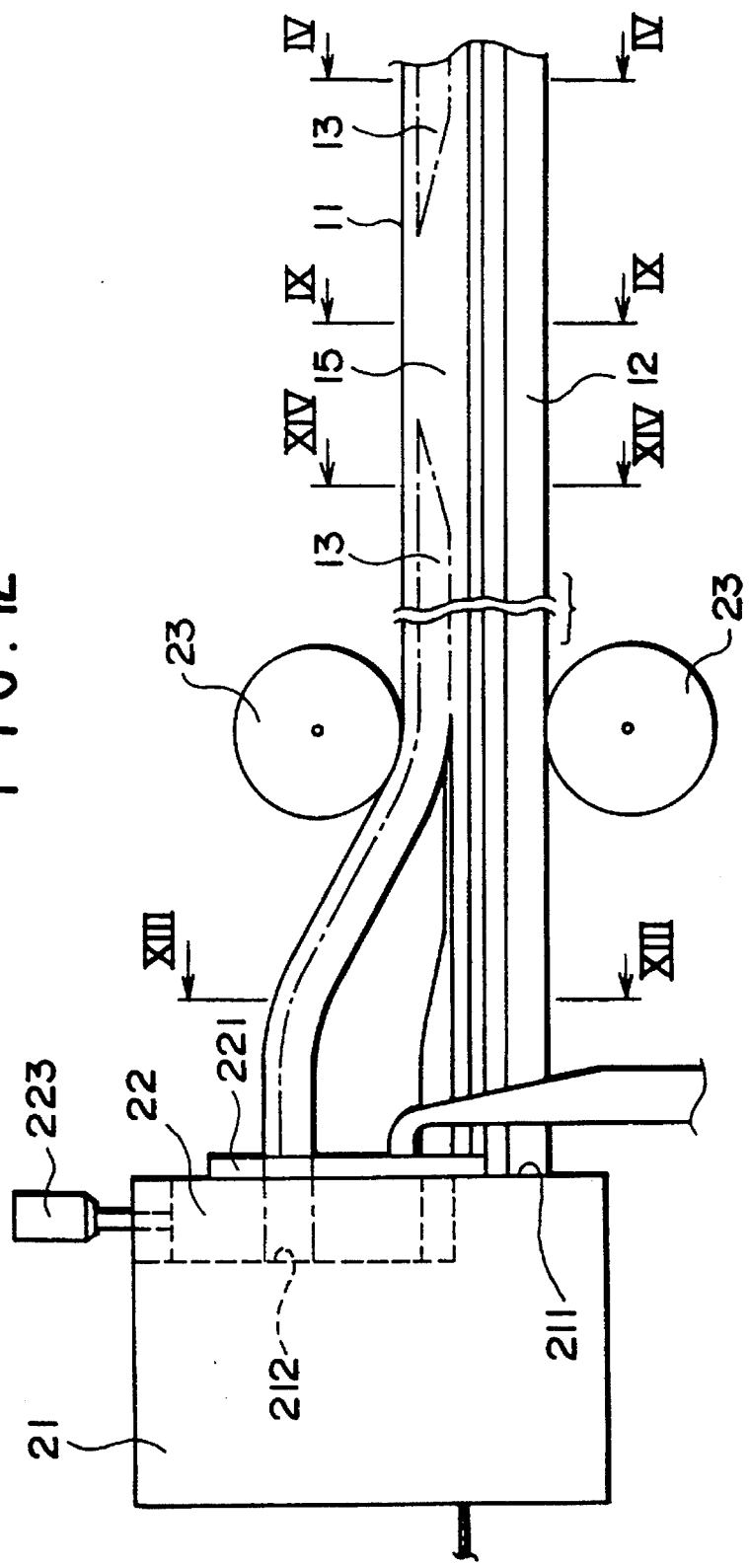
FIG. 12 is a side view showing the state of the molding being extruded by the molding equipment (dies) shown in FIGS. 10 and 11.

As FIGS. 10, 11, and 12 show, the extruder comprises the first die 21 and second die 22 arranged in the molding extruding direction (vertical direction on the paper). Said first die 21 is fixed and has an approximate C-shaped extrusion opening 211 for forming the three walls corresponding to the outside of said decorative portion 11, and an extrusion opening 212 for forming the wall corresponding to the base side of decorative portion 11 and the support leg 12.

These extrusion openings 211 and 212 are placed at separated positions, so that the decorative portion 11 and the leg 12 are extruded separately from said extrusion openings 211 and 212.

Said extrusion opening 212 has an enlarged section forming opening 213 corresponding to the enlarged section 15 projecting from the wall corresponding to the base side of the decorative portion 11. This enlarged section forming opening 213 is configured so as to be shielded by said second die 22. The second die 22 is supported in front of the first die 21 with a pair of guides 221 so as to be able to move in the up and down directions, and said enlarged section forming opening 213 is designed to be shielded by the lower edge 222 (shown in the figure) of the second die 22 from the top side. In addition, the second die 22 is connected to a drive system 223 causing it to reciprocate between the fully-open position shown in FIG. 10 and the fully-closed position shown in FIG. 11 by the driving force of said drive system 223.

At the approximate center of said second die 22, a rectangular opening 224 is formed, which constantly exposes said extrusion opening 211. An opening 225 is also provided to allow flow-back of extrusion resin material removed by shielding the enlarged section forming opening 213.

A pair of forming rollers 23 are provided at the front of the extrusion side of this extruder to join together said decorative portion 11 and the support leg 12 which are extruded separately from the extruder. Namely, by passing the separately extruded decorative portion 11 and support leg 12 between the pair of forming rollers 23, the two members 11 and 12 are joined into an integral member.

When the front molding section 1A and the side molding section 1C of the bumper molding 1 are to be extruded by using the dies configured above, the second die 22 which shields the enlarged section forming opening 213 provided on said first die 21 is first set to the position at which the enlarged section forming opening 213 is fully closed, as shown in FIG. 11. Then, a member having the three walls corresponding to the outside of the decorative portion 11 is extruded with a constant cross sectional shape of an approximate C shape from the extrusion opening 211 of the first die 21. At the same time, the wall corresponding to the base side of the decorative portion 11 and the support leg 12 are extruded from the extrusion opening 212 of the first die 21. At this time, because the second die 22 is set to the fully-closed state, no enlarged section 15 is formed. The decorative portion 11 and the support leg 12 which are thus separately extruded, are fed to a pair of forming rollers 23 to be joined into an integral member. Thus, a molding body with a cross-sectional shape having no enlarged section 15 is produced.

Figure 13:
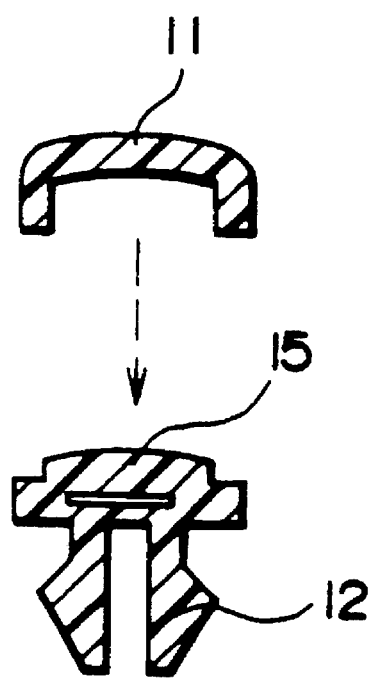
FIG. 13 is a cross-sectional view taken along the line XIII—XIII in FIG. 12.
Figure 14:
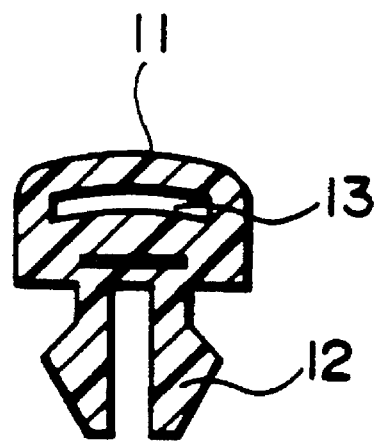
FIG. 14 is a cross-sectional view taken along the line XIV—XIV in FIGS. 8 and 12.

At the portion corresponding to the corner molding section 1B, said second die 22 is shifted from the fully-closed state shown in FIG. 11 to the fully-open state shown in FIG. 10. Then, an enlarged section 15 is formed, as described above, on the wall corresponding to the base side of the decorative portion 11. When the second die 22 is in a position between the positions shown in FIGS. 11 and 10, the enlarged section 15 is formed with a slightly projected state, as shown in FIG. 13, for example. Similarly to the above case, the decorative portion 11 and the support leg 12 which are separately extruded from the extruder are fed to the pair of forming rollers 23 to be joined into an integral member. Thus, a molding section having the cross-sectional as shown in FIG. 14 is produced. This extrusion method allows the above-mentioned bumper molding 1 to be produced continuously in one piece.

The following describes an example of a front windshield molding for an automobile to which the present invention is applied.

As FIG. 1 shows, front windshield glass 33 is installed, from the outside, to the inner periphery of the front windshield frame opening formed by the front edge of the roof panel 31 and the front edges of the pillar panels 32. A thin, continuous long space is formed between the periphery of this front windshield glass 33 and the inner periphery of the windshield frame opening of the body panels 31 and 32. A long belt-shaped windshield molding 35 is installed to cover said thin, long space.

Figure 15:
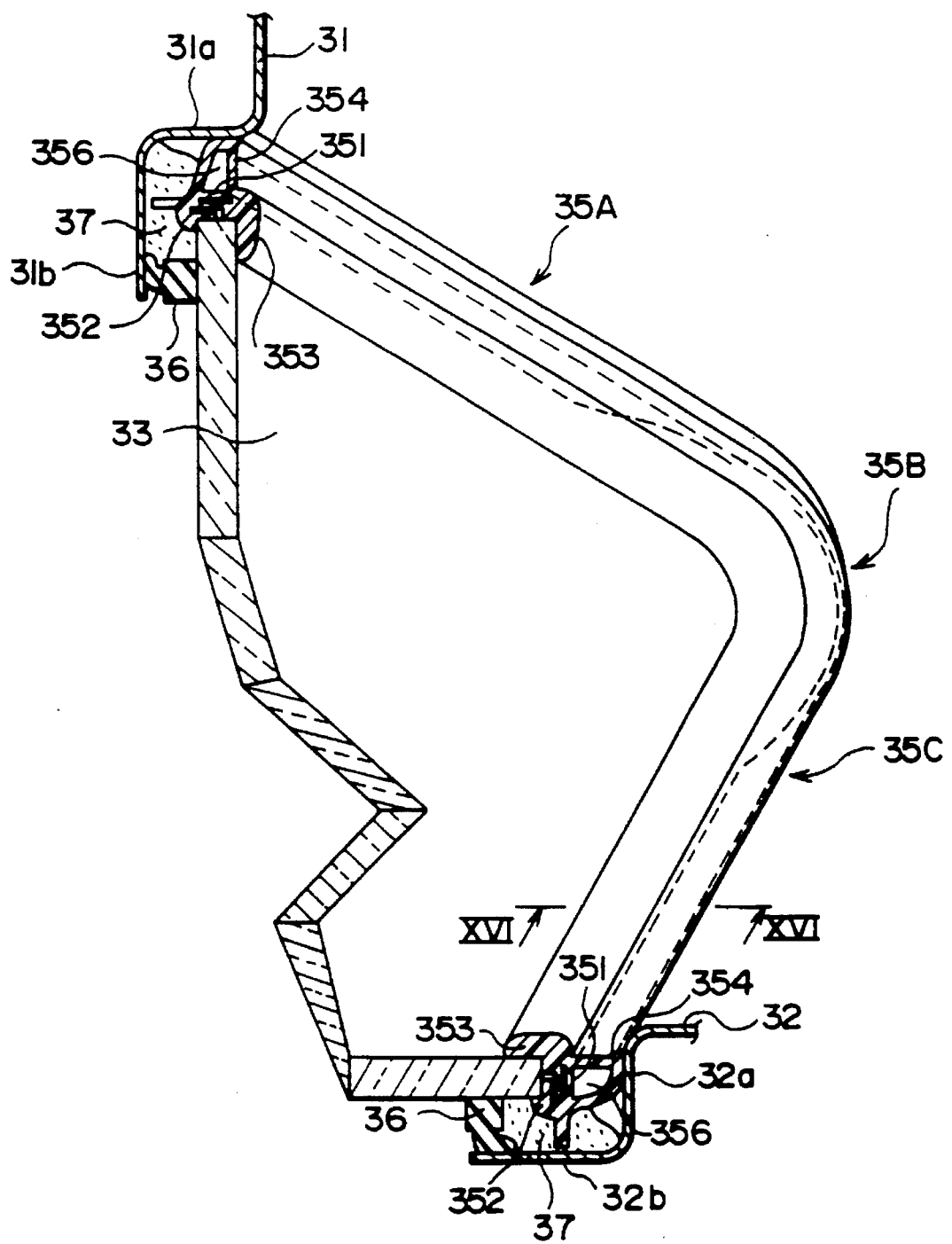
FIG. 15 is an explanatory cross-sectional view of the vicinity of a corner showing the mounted structure of the windshield molding in another embodiment of the present invention.
Figure 16:
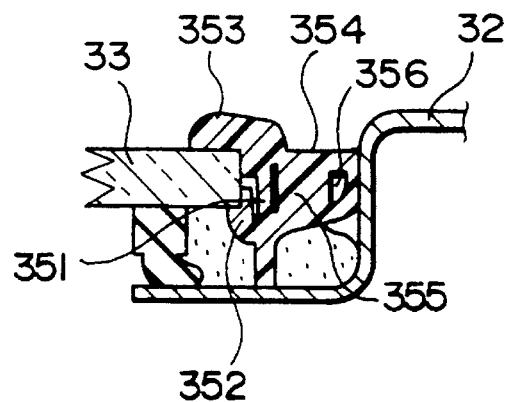
FIG. 16 is a cross-sectional view taken along the line XVI—XVI in FIG. 15.
Figure 17A:
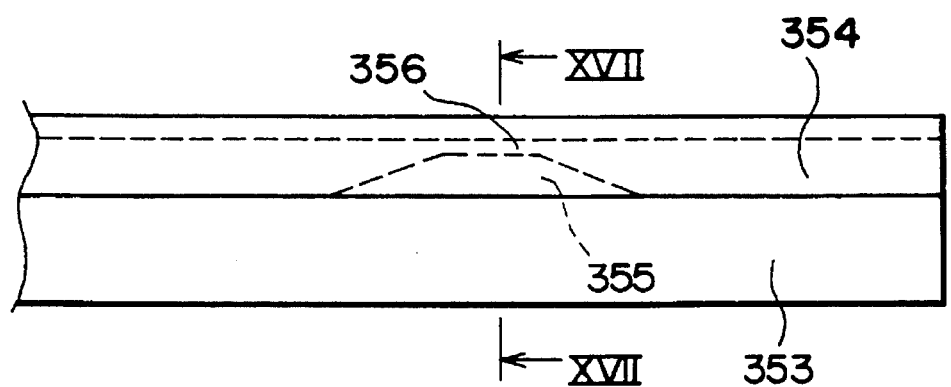
FIGS. 17(a) and 17(b) contain enlarged views of the enlarged section of the windshield molding shown in FIG. 15 before being installed, where
Figure 17B:
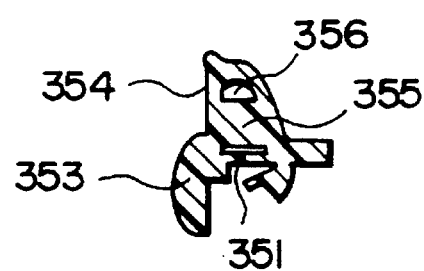

Said windshield molding 35 comprises an upper molding section 35A, a pair of corner molding sections 35B, and a pair of side molding sections 35C which are produced continuously in one piece. It is produced so that the cross-sectional shape orthogonal to the longitudinal direction of the molding is made constant throughout the entire length. Said respective sections are installed to the upper edge, corner edges, and side edges of the front windshield glass 33. The shape and the mounted structure of the windshield molding 35 for an automobile in the second embodiment are shown in FIGS. 15 to 17. The front edges of the body panels 31 and 32 are bent so as to have a stepped shape whereby the steps extend toward the inside. Flanges 31*b* and 32*b* are provided through the inside bent portions 31*a* and 32*a*. On the outer surfaces of these flanges 31*b* and 32*b*, said front windshield glass 33 is placed at a constant height through rubber seal 36. The upper edge of said front windshield glass 33 is positioned facing the inside bent portions 31*a* and 32*a* at a constant spacing. Adhesive 37 is inserted to fill the space formed by the front windshield glass 33, inside bent portions 31*a* and 32*a*, and the flanges 31*b* and 32*b*. This adhesive 37 adheres said members 33 and 36 to 31*a*, 32*a*, 31*b*, and 32*b*.

Support leg 351 making up part of the molding body is inserted between said front windshield glass 33 and the inside bent portions 31*a* and 32*a*. A glass engagement lug 352 made up of a hook-shaped projecting member is provided on the inside edge (lower edge) of this support leg 351. This glass engagement lug 352 engages with the edge of the front windshield glass 33 from the inside (lower side).

A lip-shaped decorative portion 353 is provided on the outside edge (upper edge) of said support leg 351. This decorative portion 353 extends from said support leg 351 toward the upper side of the front windshield glass 33, contacting the outer surface of the front windshield glass 33 for sealing.

A hollow seal portion 354 is provided on the outer periphery wall of said support leg 351, which projects from the outer periphery wall of the support lug 351. The projecting end, i.e., the outer periphery end of this hollow seal portion 354 is pressed elastically against the inside bent portions 31*a* and 32*a* of the body panels 31 and 32 to block off the space between the edge of the front windshield glass 3 and the inside bent portions 31*a* and 32*a*.

The outer surface shape of the cross section of said hollow seal portion 354 orthogonal to the longitudinal direction has approximately the same contour shape throughout the entire molding length. An enlarged section 355 is provided at several places in the longitudinal direction of this hollow seal portion 354, which is made by enlarging the inner wall of said hollow seal portion 354 towards the hollow inner side. For example, an enlarged portion 355 is provided at the region corresponding to a corner. Said enlarged portion 355 is formed so as to be enlarged from the outer periphery wall of the support leg 351 toward the outer periphery side the (upper side in FIG. 17) in the hollow inner space of the hollow seal portion 354. The enlargement amount, i.e., the thickness, is increased gradually in the longitudinal direction, and after the maximum enlargement is reached, is decreased again. The hollow inner space 356 in hollow seal portion 354 is narrowed by the amount corresponding to the enlarged section.

In the front windshield molding 35 having the configuration described above, the regions of the hollow seal portion 354 where reinforcement is required, more specifically, the corners, are reinforced by the enlarged section 355 provided inside this hollow seal portion 354, thus the providing required rigidity, i.e., a form-retaining property. Accordingly, the windshield molding 35 is prevented from being displaced from the mounted position in the glass width direction after it is mounted to the body panels, and from being crushed and deformed at the curved corners.

It should be noted that although for the hollow seal portion 354 in this embodiment, the hollow inner space 356 is narrowed due to the enlargement of the enlarged section 355, it is also possible to enlarge the enlarged section 355 without leaving the hollow inner space 358 to form a solid cross-sectional shape.

The following describes the extruder for the windshield molding 35 for automobiles and the extrusion method thereof.

Figure 18:
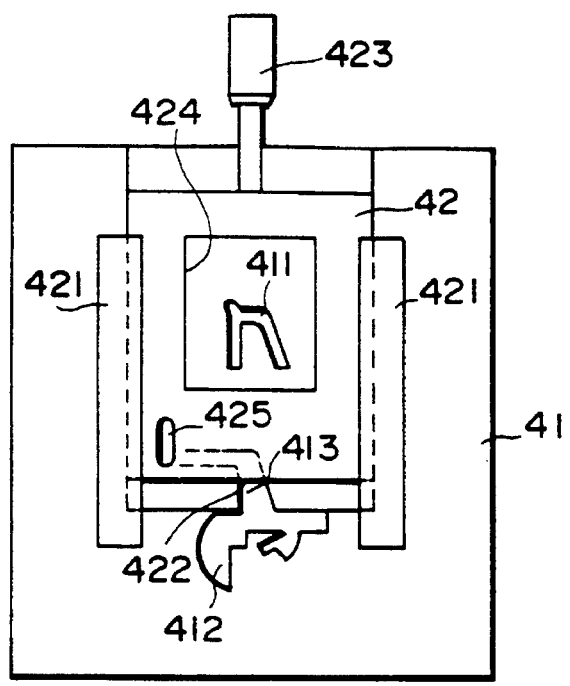
FIG. 18 is an explanatory front view showing an example of molding equipment (dies) for the windshield molding shown in FIGS. 15 to FIG. 17(b).
Figure 19:
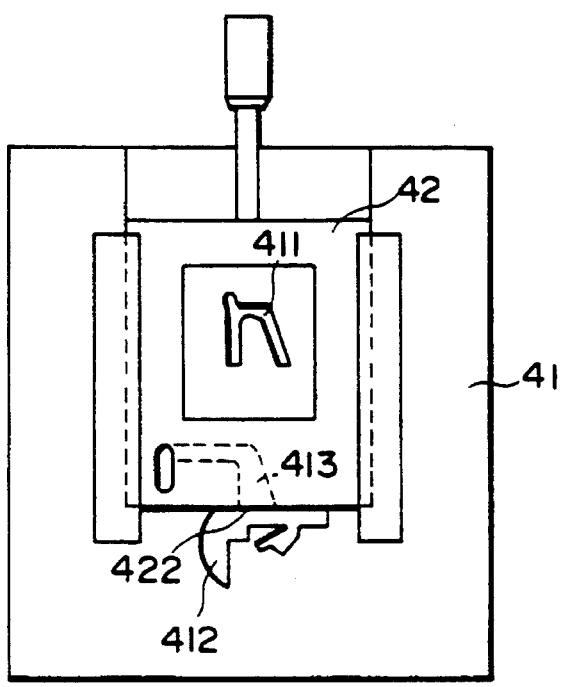
FIG. 19 is a cross-sectional view showing the molding equipment (dies) shown in FIG. 18 in a moved state.
Figure 20:
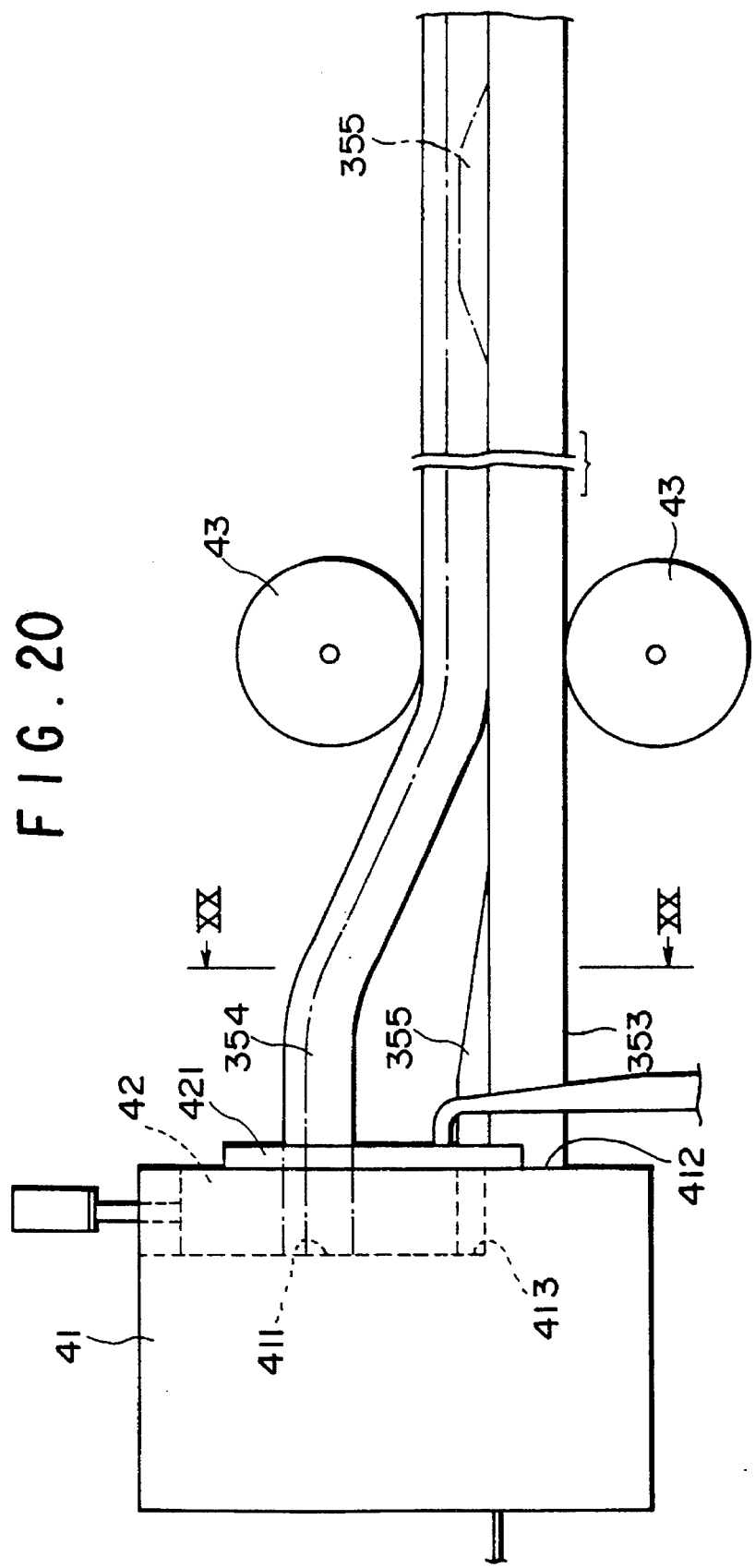
FIG. 20 is a side view showing the state of the molding being extruded by the molding equipment (dies) shown in FIGS. 18 and 19.

As FIGS. 18, 19, and 20 show, the extruder comprises the first die 41 and second die 42 arranged in the molding extruding direction (vertical direction on the paper). Said first die 41 is fixed and has an extrusion opening 411 for forming said hollow seal portion 354 and an extrusion opening 412 for forming each molding section of the molding body excluding this hollow seal portion 354. These extrusion openings 411 and 412 are placed at separated positions, so that the hollow seal portion 354 and the other molding body are extruded separately from said extrusion openings 411 and 412.

Said extrusion opening 412 has an opening corresponding to each section of the support leg 351, decorative portion 353, and the glass engagement lug 352 making up the molding body, and also has an enlarged section forming opening 413 corresponding to the enlarged section 355 projecting from support leg 351. This enlarged section forming opening 413 is configured so as to be shielded by said second die 42.

The second die 42 is supported in front of the first die 41 with a pair of guides 421 so as to be able to move in the up and down directions, and said enlarged section forming opening 413 of said extrusion opening 412 is designed to be shielded by the lower edge 422 (shown in the figure) of the second die 42 from the top side.

In addition, this second die 42 is connected to a drive system 423 so that it reciprocates between the fully-open position shown in FIG. 18 and the fully-closed position shown in FIG. 19 by the driving force of this drive system 423.

At the approximate center of said second die 42, a rectangular opening 424 is formed, which constantly exposes said extrusion opening 411. An opening 425 is also provided for flow-back of extrusion resin material removed by shielding the enlarged section forming opening 413.

A pair of forming rollers 43 are provided at the front of the extrusion side of said extruder to join together said hollow seal portion 354 and other molding body portions which are extruded from the extruder. In other words, by passing the separately-extruded hollow seal portion 354 and other molding body portions between the pair of forming rollers 43, the members are joined into an integral member.

When the windshield molding 35 is to be extruded by using the dies configured above, the second die 42 which shields the enlarged section forming opening 413 of extrusion opening 412 provided on said first die 41 is first set to the position at which the enlarged section forming opening 413 is fully closed, as shown in FIG. 19. Then, the hollow seal portion 354 is extruded with a constant hollow cross-sectional shape from the extrusion opening 411 of the first die 41. At the same time, a molding body consisting of support leg 351, decorative portion 353, and glass engagement lug 352 is extruded from the extrusion opening 412 of the second die 42. At this time, because the second die 42 is set to the fully-closed state, no enlarged section 355 is formed. The hollow seal portion 354 and the other molding body portions which are thus separately extruded are fed to a pair of forming rollers 43 to be joined into an integral member. Thus, a windshield molding 35 with a cross-sectional shape having no enlarged section 355 is produced.

Figure 21:
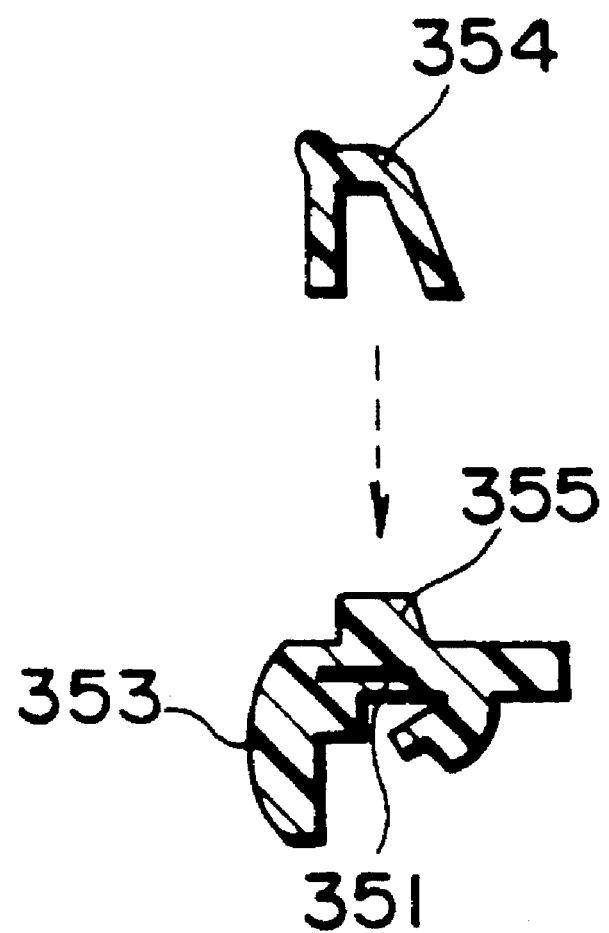
FIG. 21 is a cross-sectional view taken along the line XXI—XXI in FIG. 20.

With a specified timing, at the portion corresponding to a corner, for example, said second die 42 is shifted from the fully-closed state shown in FIG. 19 to the fully-open state shown in FIG. 18. Then, an enlarged section 355 is formed, as described above, at a specified position on the wall of the support leg 351. When the second die 42 is at a position between the positions shown in FIGS. 19 and 13, the enlarged section 355 is formed in a slightly projected state, as shown in FIG. 21, for example.

Similarly to the above case, the hollow seal portion 354 and the other molding body portions which are separately extruded from the extruder are fed to the pair of forming rollers 43 to be joined into an integral member. Thus, a windshield molding 35 having the cross-sectional shape shown in FIG. 17 is produced. This extrusion method allows the above-mentioned windshield molding 35 to be produced continuously in one piece.

Figure 22:
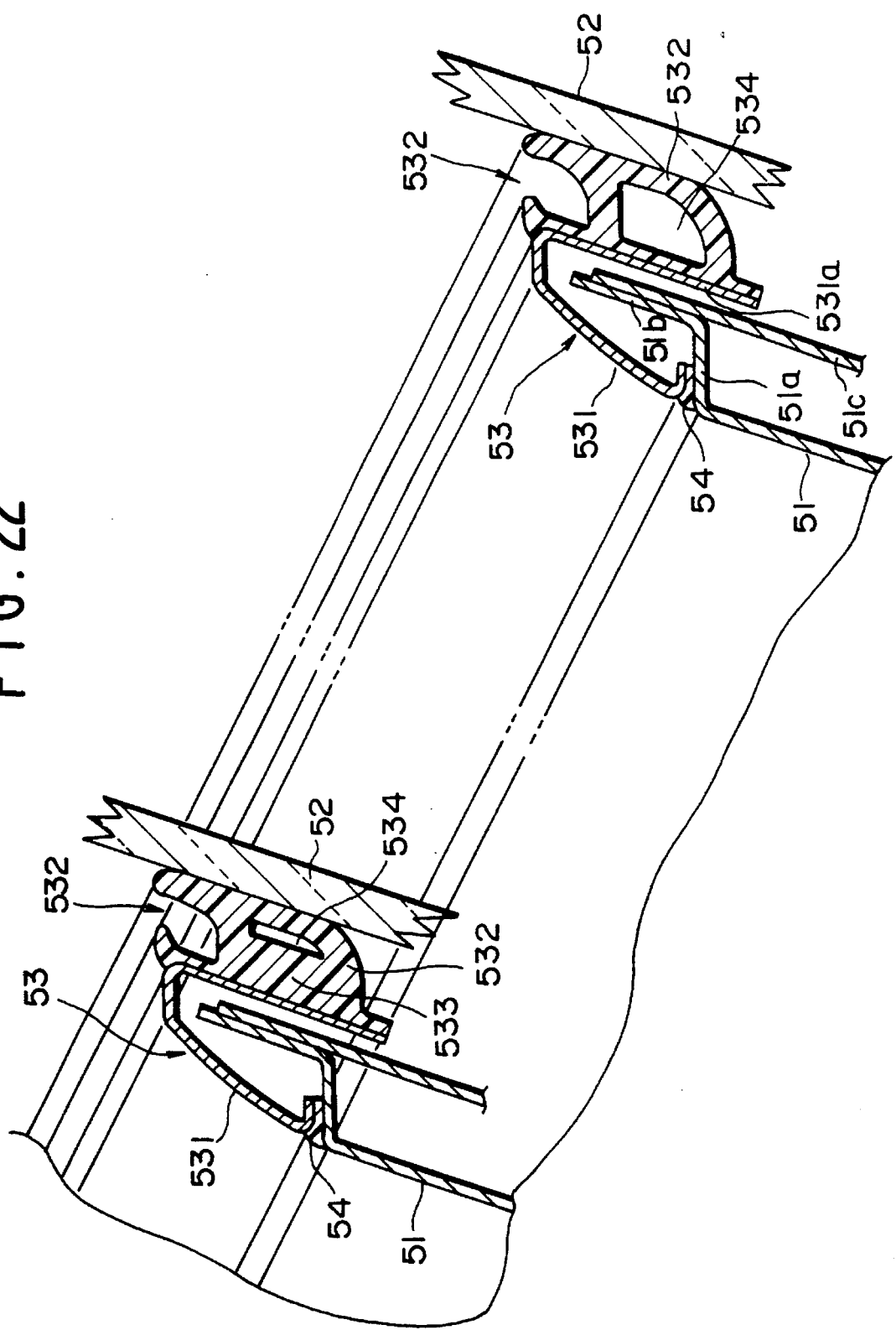
FIG. 22 is an explanatory cross-sectional view of the mounted structure of the door-belt molding in another embodiment of the present invention.

In the embodiment shown in FIG. 22, the windshield glass 52 is supported inside the door outer plate 51 of an automobile so as to freely move up and down and the door belt molding 53 consisting of a long belt-shaped extruded member is installed on the upper edge corresponding to the waist line of said door outer plate 51.

The upper edge corresponding to the waist line of said door outer plate 51 is bent to an approximate right angle so as to form a step toward the inside. At the bent edge, a flange 51b is provided which extends to the upper side through the bent wall 51a. A inner plate 51c is placed on the inside of this door outer plate 51. The upper edge of the inner plate 51c is pressed against the upper edge of said flange 51b from the inside. Said door belt molding 53 is mounted at the overlapping portion of the flange 51b and the inner plate 51c.

This door belt molding 53 comprises a molding portion 531 provided to cover the overlapping portion of said flange 51b and the inner plate 51c from the upper side, and also a hollow seal portion 532 projecting from this molding portion 531 toward the windshield glass 52. Said molding portion 531, which consists of a long belt-shaped metal piece formed into a cross section of an approximate C shape, is mounted with reference to the flange 51b of the door outer plate 51 in position. The edge portion of the outside of this molding portion 531 is fixed on the bent wall 51a of the door outer plate 51 through the end rubber 54.

Said hollow seal portion 532 is adhered to the inner wall 531a of the molding portion 531 and is also pressed elastically against the surface of the windshield glass 52 to block off the space. In this embodiment also, the outer surface shape of the cross section of the hollow seal portion 532 has the same contour shape throughout the entire molding length. Also, the enlarged section 533 provided in the hollow inner space of this hollow seal portion 532 is formed so that it is enlarged from the door outer plate 51 side of the hollow seal portion 532 toward the windshield glass 52 side. The enlargement amount, i.e., the thickness, is increased gradually in the longitudinal direction, and after the maximum enlargement is reached, is decreased again. The hollow inner space 534 of the hollow seal portion 532 is narrowed by the amount corresponding to enlarged section 533.

The following describes the extruder for the door belt molding 53 for automobiles and the extrusion method thereof. It should be noted that although in each of the embodiments described above, the hollow portion and the other regions are extruded completely separately, in this embodiment, the hollow portion and the other regions are extruded separately are part but other portions in connected together. Also in this method embodiment, in the hollow seal portion 532 the enlarged section 533 is enlarged without leaving hollow inner space 534, to form a solid cross-sectional shape.

Figure 23:
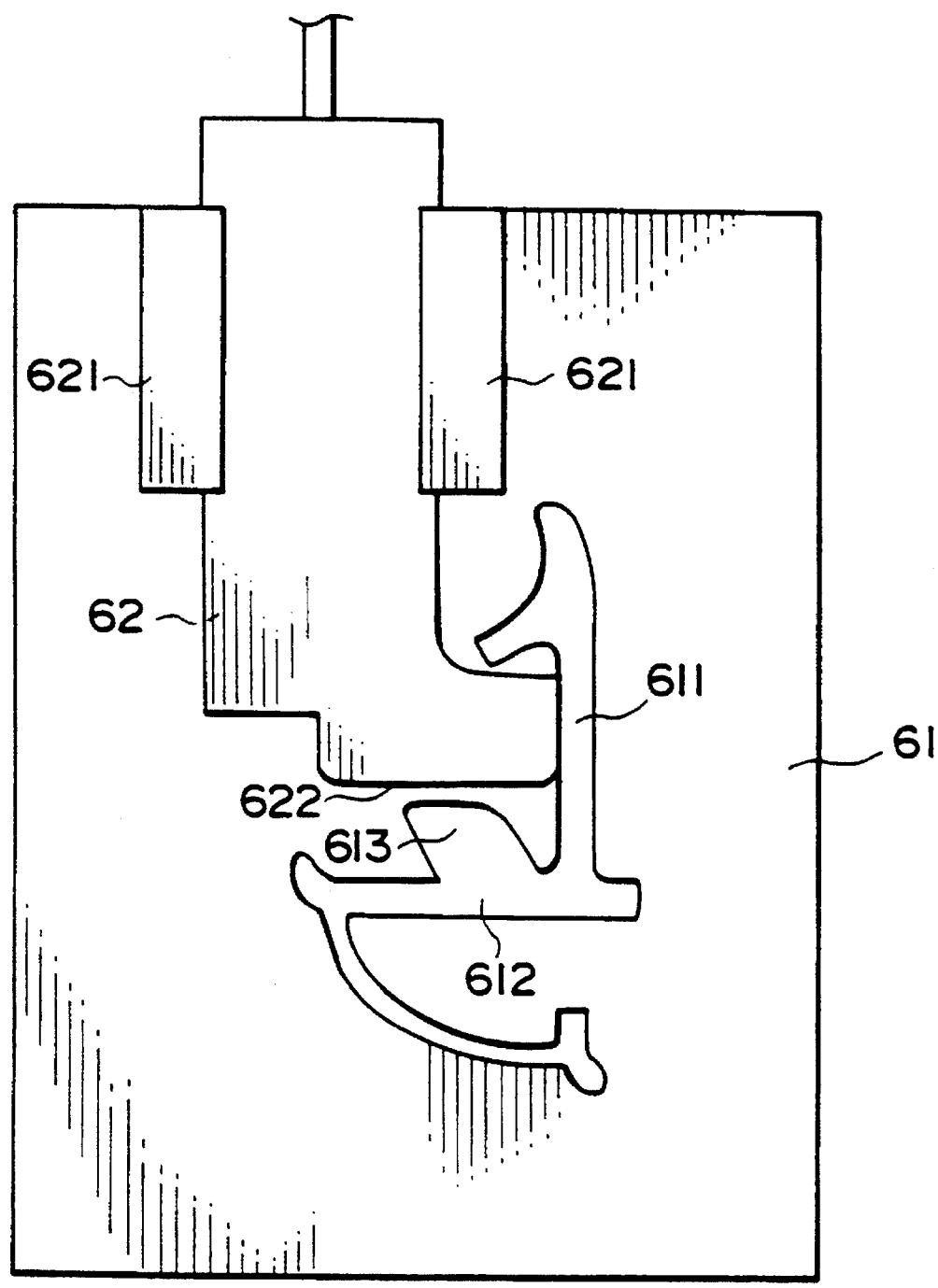
FIG. 23 is an explanatory front view showing an example of molding equipment (dies) for the door-belt molding shown in FIGS. 22.
Figure 24A:
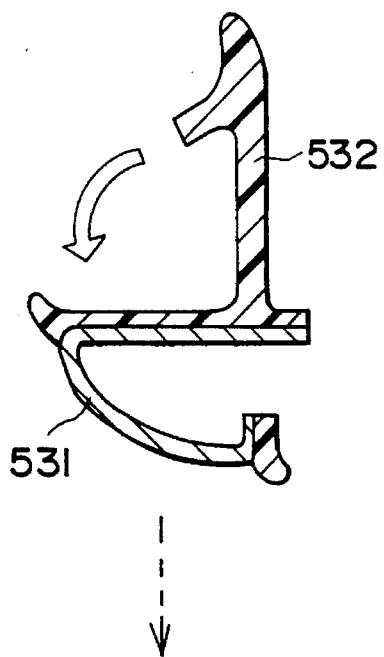
FIGS. 24(a) and (b) and FIGS. 25(a) and (b) are cross-sectional views showing the process of making the door-belt molding shown in FIGS. 22.

As FIG. 23 show, the extruder comprises the first die 61 and second die 62 arranged in the molding extruding direction (vertical direction on the paper). Said first die 61 is fixed and has an extrusion opening 611 for forming said hollow seal portion 532 and an extrusion opening 612 for forming molding portion 531. These extrusion openings 611 and 612 are placed so as to be separated in part but other portions are connected together so that the hollow seal portion 532 and the molding portion 531 are extruded separately in part but the other portions are connected together from said extrusion openings 611 and 612.

Said extrusion opening 612 has an enlarged section forming an 613 corresponding to the enlarged section 533. This enlarged section forming opening 613 is configured so as to be shielded by said second die 62.

The second die 62 is supported in front of the first die 61 with a pair of guides 621 so as to be able to move in the up and down directions, and said enlarged section forming opening 613 of said extrusion opening 612 is designed to be shielded by the lower edge 622 (shown in the figure) of the second die 62 from the top side.

Figure 24B:
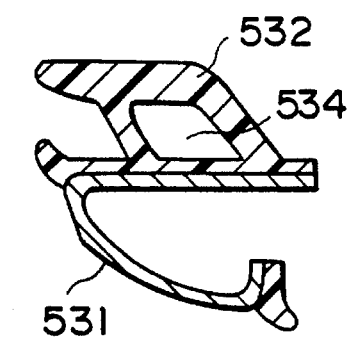

When the door belt molding 53 is to be extruded by using the dies configured above, the second die 62 which shields the enlarged section forming opening 613 of extrusion opening 612 provided on said first die 61 is first set to the position at which the enlarged section forming opening 613 is fully closed. Then, the hollow seal portion 532 and the molding portion 531 are extruded separately in part but the other portions are connected together from said extrusion openings 611 and 612. At this time, because the second die 62 is set to the fully-closed state, no enlarged section 533 is formed. The hollow seal portion 532 and the molding portion 531 which are thus extruded separately connected part but the other portions in together are fed to a forming rollers to be joined into an integral member. Thus, a door belt molding 53 with a cross-sectional shape, shown in FIG. 24(b), having no enlarged section 533 is produced.

Figure 25A:
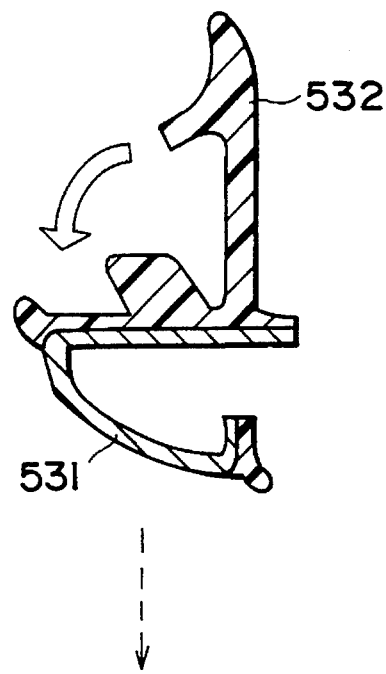

With specified timing, said second die 62 is shifted gradually from the fully-closed state to the fully-open state shown in FIG. 23. Then, an enlarged section 533 is formed, as shown in FIG. 25(a). Then the second die 62 is at a middle position, the enlarged section 533 is formed in a slightly projected state.

Similarly to the above case, the hollow seal portion 532 and the molding portion 531 which are extruded separately in part but the other portion in connection together from the extruder are fed to the pair of forming rollers to be joined into an integral member.

Figure 25B:
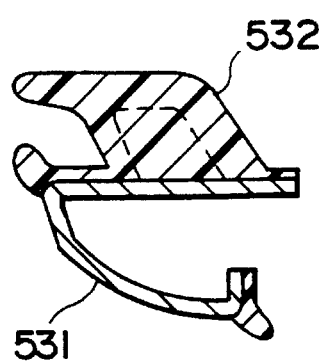

Thus, a door belt molding 53 having the cross-sectional shape shown in FIG. 25(b) and FIG. 22 is produced. This extrusion method allows the above-mentioned door belt molding 53 to be produced continuously in one piece.

It should be noted that this invention is not limited to the above-mentioned bumper molding, windshield molding, and door belt molding alone but may be applied to various weather strips as well.

We claim:

1. A hollow extrudate which comprises:
    a belt-shaped member produced by extrusion and having hollow portions extending in a longitudinal direction of said member wherein an outer surface shape of a cross-section of a wall forming said hollow portion orthogonal to the longitudinal direction has a substantially constant shape in the longitudinal direction; and
    wherein said member includes a solid portion extending in the longitudinal direction and interconnecting said hollow portions, said solid portion forming a reinforced portion of the member.

2. The hollow extrudate according to claim 1, wherein said solid portion comprises an enlarged section of said hollow portion formed by enlarging the walls of the hollow portion.

3. The hollow extrudate according to claim 1, which comprises a leg connected to said member.

4. The hollow extrudate according to claim 1, wherein said member comprises a first and second extruded region pressed together to form said hollow portion.

5. The hollow extrudate according to claim 1, wherein said hollow portion is D-shaped in cross-section.

6. The hollow extrudate according to claim 1, wherein said substantially constant shape extends throughout an entire length dimension of said member.

7. The hollow extrudate according to claim 1, wherein said member comprises a first and second extruded region pressed together to form said hollow portion and said solid portion.

\* \* \* \* \*